US011657428B1

(12) United States Patent
Ritchie et al.

(10) Patent No.: US 11,657,428 B1
(45) Date of Patent: May 23, 2023

(54) ENHANCED GOAL-BASED AUDIENCE SELECTION

(71) Applicant: Amazon Technologies, Inc., Seattle, WA (US)

(72) Inventors: Graham Reid Scarth Ritchie, Burntisland (GB); Pawel Pomorski, Edinburgh (GB); Zhun Zhang, Edinburgh (GB); Ravi Bhagavan, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/115,392

(22) Filed: Dec. 8, 2020

(51) Int. Cl.
 *G06Q 30/02* (2012.01)
 *G06Q 30/0251* (2023.01)
 *G06N 20/00* (2019.01)

(52) U.S. Cl.
 CPC ......... *G06Q 30/0255* (2013.01); *G06N 20/00* (2019.01)

(58) Field of Classification Search
 CPC .................................................. G06Q 30/0255
 See application file for complete search history.

(56) References Cited

U.S. PATENT DOCUMENTS

| 9,361,322 | B1* | 6/2016 | Dutta | G06Q 30/0275 |
| 2005/0071218 | A1* | 3/2005 | Lin | G06Q 30/0245 |
| | | | | 705/14.44 |
| 2016/0019581 | A1* | 1/2016 | Wu | G06Q 30/0269 |
| | | | | 705/14.43 |
| 2016/0343026 | A1* | 11/2016 | Cheng | G06Q 30/0244 |
| 2018/0150874 | A1* | 5/2018 | Chen | G06Q 30/0254 |
| 2018/0225708 | A1* | 8/2018 | Ferber | G06Q 30/0242 |

* cited by examiner

*Primary Examiner* — Azam A Ansari
(74) *Attorney, Agent, or Firm* — Eversheds Sutherland (US) LLP

(57) ABSTRACT

Devices, systems, and methods are provided for goal-based audience selection. A method for generating an audience using machine learning may include receiving a request to generate an audience for an advertisement campaign, the request including an objective associated with presentation of the advertisement campaign. The method may include determining first user actions based on the objective, and identifying first users of a system who performed the first user actions using the system. The method may include determining second user actions performed by the first users prior to performing the first user actions, and identifying second users of the system who performed the second user actions and failed to perform the first user actions. The method may include generating a target audience to which to present the advertisement campaign, and causing presentation of the advertisement campaign to the target audience.

20 Claims, 6 Drawing Sheets

ENHANCED GOAL-BASED AUDIENCE SELECTION

BACKGROUND

When using advertisement campaigns, advertisers may generate the advertisement campaigns based on a target audience. For example, knowing information about an audience to which to advertise, advertisers may select advertisements to include in a campaign. Alternatively, advertisers may define audience criteria with which to identify audience members for an advertisement campaign. For example, advertisers may define audience demographics for a system to use when identifying audience members who share the audience demographics. However, advertisers may not know who the optimal audience is for a generated advertisement campaign.

Figure 1:
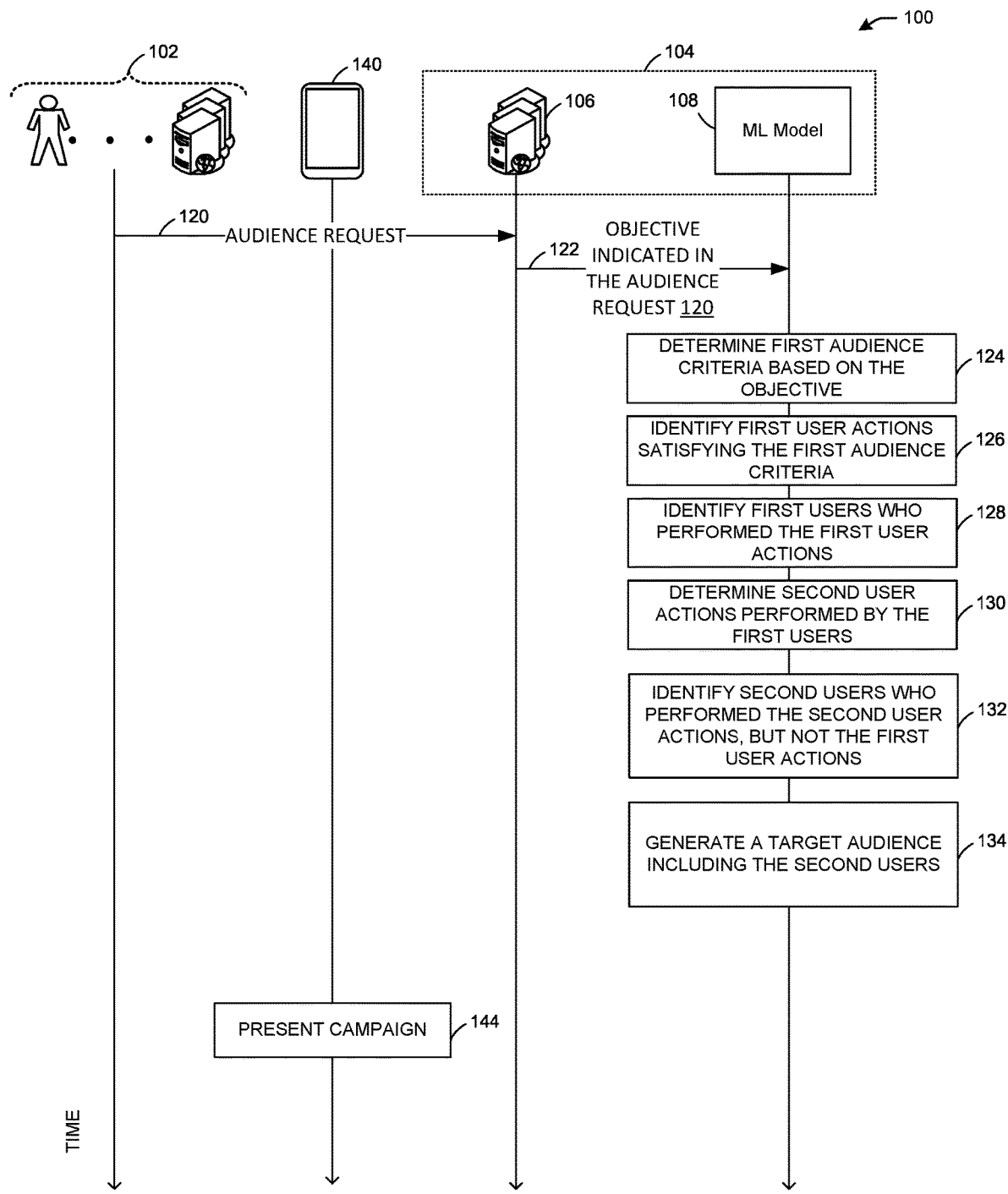
FIG. 1 illustrates an example process for goal-based audience selection, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for goal-based audience selection for advertisement campaigns.

Some advertisers generate target audiences for advertisement campaigns by using a descriptive, rule-based approach. The advertisers provide a targeting expression which defines the target audience for an advertisement campaign. Many advertisers seek to optimize advertisement campaign audiences to achieve specific marketing goals such as driving sales or views of their products. Currently, some advertisers have to experiment with identifying different audience segments and adjusting a targeting expression. To observe effects of these modifications, advertisers need to wait to evaluate how their campaign performance changes. This process may take a significant amount of time and marketing expertise.

In goal-based advertising, however, an advertiser may request a system to identify and generate a target audience for an advertisement campaign based on one or more goals (or objectives) of the advertisement campaign, and without providing any information about the target audience. In this manner, goal-based advertising may be distinguished from descriptive advertising in which the advertiser (or another party) provides descriptive information for a target audience, such as demographics, product purchases, page views, advertisement views, computer system interactions, user subscriptions, and the like. When the advertiser provides descriptive information for a target audience, a system with access to user information may determine whether any users satisfy the descriptive information (e.g., share the demographic information, have purchased a particular product, have performed a computer-based action, have a subscription, and the like). The absence of descriptive information provided for a requested target audience is a feature of goal-based advertising, as advertisers often may not know who the target audience should be and what characteristics the target audience should have in order to achieve one or more goals, such as product purchases, product/page views, advertisement views/interactions, sign-ups, downloads, increasing brand awareness, and the like.

There is therefore a need for goal-based audience selection for advertisement campaigns.

In one or more embodiments, a system may receive requests to generate target audiences for advertisement campaigns, and may use machine learning to predict which users of the system are likely to contribute to a specified goal (objective) for the campaign (e.g., as indicated in the request). Goals may include user interactions with products, including, but not limited to, general purchases, ad-attributed purchases or views of the product, brand awareness, and the like. The goals may be combined with time effects for fine-tuned targeting, such as short-term purchases for capturing early adopters (e.g., users predicted to purchase a product within a week or some other time duration after being presented the campaign), or long-term views for driving product awareness (e.g., users predicted to purchase the product within a month or some other time duration after being presented the campaign). The enhanced approach using machine learning may allow advertisers to optimize their campaign goals without having to develop effective targeting expressions. When an advertiser creates a user segment, the advertiser may provide a set of products, a goal for the campaign advertising the product, and a desired segment size (e.g., desired number of users to include in the target audience), but may not provide descriptive information for the target audience (e.g., the request to generate a target audience may amount to a request to "find an audience for the campaign" instead of "finding an audience that has this criteria"). The machine learning model receives user purchase and advertisement history within the system as inputs, and predicts user responses to an advertisement campaign over a given time horizon (e.g., will the user satisfy the goal within a week, a month, a year, etc.). After determining the probabilities of users to satisfy a campaign goal (or multiple campaign goals), the machine learning model may select the users with the highest probabilities to satisfy the campaign goal(s).

In one or more embodiments, the system may include one or more application programming interfaces (APIs) that may determine and provide an expected composition of the final audience by stages of the ad funnel to which the users belong at the time (e.g., awareness of a product/brand, interest in a product/brand, evaluation of a product/brand, purchase of a product/brand, etc.). Advertisers may specify what proportions of users from each stage of the ad funnel should be targeted, and the proportions may be forwarded to the machine learning model, which may adjust the composition of the final audience. The resultant target audiences are returned with the updated statistics for proportions of users by each stage of the ad funnel together with more detailed insights into the targeted audience. The iterative model retraining based on advertiser feedback on the desired composition of the audience may continue until a desired target audience and goal metric is reached.

In one or more embodiments, in order to bridge rule-based targeting with model-based audiences, the machine learning model may learn customer propensity conditioned on a targeting expression. The targeting expression may sent with customer history as an input to the model, which may select high-propensity customers who are also likely to satisfy the targeting expression.

In one or more embodiments, the use of enhanced goal-based audiences may automatically identify relevant system users and eliminate the need for advertisers to combine multiple rule-based user groups to meet a campaign objective. For example, instead of having to combine 10-15 user groups in a campaign by targeting users who are ready to purchase a pair of headphones (e.g., user groups with users shopping for headphones, users shopping for headphone accessories, technology early-adopters etc.), the system may allow advertisers simply to specify a campaign goal (e.g., to drive product purchases), and may generate an audience that includes the relevant set of users, instead of several user groups. Advertisers may trade off reach versus performance of targeting using a single goal-based audience. In addition to the campaign goal, advertisers may opt to indicate that including more users in their audience is a priority over including the highest propensity users, or vice versa.

In one or more embodiments, to configure a goal-based audience, an advertiser may specify a list of unique product identifiers (e.g., Unique Product Codes, Standard Identification Numbers, and the like), brands or retail categories, a campaign goal, and reach versus performance preferences. The system may identify customer behaviors, including product views, purchases, search queries, and previous interactions with ads, that help to predict a user's propensity (e.g., probability or likelihood) to respond to the campaign (e.g., by performing actions that satisfy the goal, such as purchasing a product, adding a subscription, viewing or otherwise interacting with an advertisement, downloading content, and the like). The user behaviors may be combined in the machine learning model to estimate the probability that any user will, for example, purchase one of the promoted product identifiers as a result of being shown an advertisement. Users may be included in the goal-based audience according to their estimated propensities (e.g., the most likely users to satisfy a goal may be selected, and users less likely to satisfy the goal may be excluded from the audience). The model's underlying goal-based audiences may be updated to reflect changing trends in consumer behavior.

In one or more embodiments, a goal-based audience may refer to an audience built using a machine learned model and without the request to generate the audience having descriptive information for the audience. The model may be trained to identify the system users most likely to respond to a campaign goal based on a variety of data signals. Advertisers may specify a list of product identifiers, brands, or retail categories, and a goal that the advertisers would like to drive against their selection. For example, for a conversion goal based on driving purchases, the system may use a model that estimates the probability any user (e.g., based on their historical behavioral interaction with the system, such as purchases, page views, clicks, ad views, downloads, uploads, subscriptions, product reviews, etc.) will purchase one of the specified products, within the brand, or within the retail categories selected. The model may use the estimates to identify users with a high-propensity to satisfy the advertiser's marketing goal. Advertisers will be able to trade off performance against reach by changing the underlying propensity threshold used to define their audience. Performance may be defined as a more exclusive audience that has a higher sensitivity to the relevancy of users included relative to the specified marketing goal versus reach defined by the number of unique users included in the audience. Because a goal-based audience is based on a predictive model, the system also may have the ability to constantly update the model in response to users' changes in behavior (e.g., whether users performed actions that satisfied the goal within a specified amount of time). For example, the probability thresholds and actions used to identify users likely to perform actions that satisfy or are likely to lead to satisfying the goal may be adjusted.

In one or more embodiments, instead of building a model from scratch for each goal-based audience, the system may implement a single, larger model that simultaneously may support many goal-based audiences. The system may use techniques originating from natural language processing and may build a deep neural network which may model a sequence of user interactions using the system (e.g., a web or application-based system that allows users to search for products, view product pages, purchase products, comment on products, download content, upload content, subscribe to products, brands, and/or content, and the like), representing any event with more detailed features than browse nodes (e.g., including brand and price). The model of the system may be trained initially on purchase data to learn about general user interests and product/brand preferences, and then refined based on advertising data to fine-tune the model to identify users most likely to respond to advertisements, and specialized for any advertising goal. In contrast to some existing models, the enhanced model regularly may be retrained (e.g., at a daily cadence) to respond to changing customer behavior.

In one or more embodiments, the system may receive a request to identify users and generate a target audience for an advertising campaign. The request may identify the products/brands to advertise (e.g., using unique identifiers), and may lack description information of the target audience so that the system may determine the audience on behalf of the requesting party. The request may indicate one or more goals (objectives) for the campaign, such as to drive purchases, increase product/brand awareness, drive user sign-ups/subscriptions, cause user views or other interactions with presented advertisements of the campaign, and the like. Based on an objective for the campaign, the machine learning model of the system may identify users of the system who already have satisfied the objective. For example, when the objective is to drive purchases of a product, the system may identify users of the system who have purchased the product advertised by the campaign, and/or who have purchased similar products (e.g., based on a mapping or other relationship between individual unique product identifiers accessible to the system). The users who already have performed actions that have achieved the campaign objective may be included in the target audience depending on the objective (e.g., when the objective is to cause repeat purchases), or may be excluded because those users are already interested in a product/brand. The model may identify the actions performed by those users before they achieved the objective, such as which ads, product pages, subscriptions, etc. the user viewed, signed up for, etc. before achieving the objective (e.g., before purchasing a product when the objective is to drive new purchases). The model may determine which actions performed are more likely to have resulted in (e.g., caused) the performance of the action that satisfied the objective. For example, an action of viewing an ad for an unrelated product or campaign may be assigned a lower probability for causing performance of the action that satisfied the objective that an action of viewing an ad for the product that was purchased. The model may identify correlations between actions taken by the users before the performance of the action that satisfied the objective, and actions that are more common and/or more directly related to the performance of the action that satisfied the objective may be identified as higher value actions.

In one or more embodiments, using the higher value actions, the model may identify other users who have performed the higher value actions, but who have not yet performed the action that satisfied the objective. The users who have performed the higher value actions, but who have not yet performed the action that satisfied the objective may be selected for inclusion in a target audience because they may represent users who are more likely to perform the action that satisfied the objective based on their prior actions.

In one or more embodiments, the model may evaluate the timeframes when users perform an action relative to when the users performed a prior action. For example, some users may purchase a product within a week of being presented an advertisement, while other users may take longer to purchase the product after being presented the advertisement. The objective of a campaign may specify a time duration, and the model therefore may select users based on the timing of their actions to satisfy the time duration criteria. For example, when the time duration criteria is to drive product page views within a week of ad presentation, the model may include users who have viewed product pages within a week of prior ad presentation, and may exclude users who failed to view product pages within a week of prior ad presentation. Even without time duration criteria, the model may generate multiple target audiences for an objective. For example, one target audience may include users who are likely to perform an action that would satisfy an objective within a first time duration, and another target audience may include users who are likely to perform the action within a second time duration. The model may adjust the audiences for a given campaign based on an ad funnel, such as by generating audiences targeted for increased product/brand awareness, generating target audiences for driving subscriptions, generating target audiences for driving product purchases, and the like.

In one or more embodiments, the model may receive feedback regarding the performance of campaigns, and may adjust selection criteria for generating target audiences. For example, when the performed actions of system users used to select users for the target audience do not result in achieving the objective (e.g., the number of purchases, views, etc. are below a threshold number), the model may lower the probability of the performed actions causing the performance of subsequent actions that satisfy the objective, and may select users for target audiences based on different actions for particular objective, product, brand, etc. The model may remove from the audience users who do not respond to a campaign, for example.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for goal-based audience selection, in accordance with one or more example embodiments of the present disclosure.

Referring to FIG. 1, the process 100 may include users 102 (e.g., advertisers or other parties and their devices) which may send an audience request 120 to a computer-based system 104 that may include one or more devices 106 and a machine learning (ML) model 108. The one or more devices 106 may receive the audience request 120 (e.g., at an endpoint using an application programming interface) and may provide to the ML model 108 information associated with the audience request 120. For example, the audience request 120 may be a request for the computer-based system 104 to generate a target audience for an advertisement campaign, and may lack criteria identifying the audience (e.g., the audience request 120 may indicate a request to identify users of the computer-based system 104 to include in the target audience, but without the users 102 identifying who to include in the audience or which criteria to use in identifying users to include in the audience). The audience request 120 may include one or more goals (e.g., objectives) for the campaign for which the computer-based system 104 is requested to generate a target audience. For example, the objective may be to generate brand or product awareness, generate product purchases, generate user subscriptions, or the like. The one or more devices 106 may provide to the ML model 108 the one or more objectives 122 to use to generate the target audience for the campaign.

Still referring to FIG. 1, the ML model 108 may determine, at block 124, first audience criteria based on the objective. For example, when the objective 122 includes increasing product awareness among users of the computer-based system 104, the first audience criteria may include product page views or other interactions with product information provided by the computer-based system 104 that would make users of the computer-based system 104 aware of a product (e.g., a product specified by the audience request 120). At block 126, the ML model 108 may identify first user actions satisfying the first audience criteria. When the first audience criteria is page views, then the first user actions may include product page views (e.g., using a web-based application, mobile application, or the like). At block 128, the ML model 108 may identify first users of the computer-based system 104 who performed the first user actions. When the first user actions include product page views, the ML model 108 may identify users of the computer-based system 104 who have visited a product page of a product identified by the audience request 120 or associated with a similar product or with the same seller. At block 130, the ML model 108 may determine second actions performed by the first users before performing the first actions. In particular, the ML model 108 may determine actions performed by the first users prior to the first users performing the first actions (e.g., interactions with advertisements, product pages, etc.), and that the ML model 108 identifies as actions that may have cause the first users to perform the first actions (e.g., determining a probability that a second action caused the first action, and determining whether the probability exceeds a threshold probability)

Still referring to FIG. 1, at block 132, the ML model 108 may identify second users who performed the second user actions, but who have not yet performed the first user actions. The second users may be candidates for the target audience, as their non-performance of the first user actions may indicate that the campaign objective may be satisfied by including them in the target audience and having them respond to the campaign by performing the first user actions. At block 134, the ML model 108 may generate a target audience for the campaign in response to the audience request 120. The target audience may include the second users, and may include or exclude the first users (e.g., the first users already may be aware of a product/brand, already have purchased the advertised product, already are subscribers, etc.). Once the target audience has been generated, the computer-based system 104 may identify users (e.g., user device 140), and may facilitate the sending of the advertisement campaign indicated by the audience request 120 to the users at step 142 (e.g., by sending the audience data to the users 102 or to another party to serve the advertisement campaign to the target audience). The user devices (e.g., user device 140) may present the campaign 144 (e.g., using an application, a message, or the like). In this manner, the computer-based system 104 may cause presentation of the advertisement campaign to the users of the targeted audience.

In one or more embodiments, the computer-based system 104 may be associated with an online purchasing system with which users (e.g., the user device 140) may view products and product pages, add products to a shopping cart, purchase products, subscribe to products and content, download and upload content, sell products, review products, and the like. In this manner, the computer-based system 104 may have access to user actions such as product page views, purchases, subscriptions, and the like.

In one or more embodiments, the objectives 122 may include user interactions with products, including, but not limited to, general purchases, ad-attributed purchases or views of the product, brand awareness, and the like. The objectives 122 may be combined with time effects for fine-tuned targeting, such as short-term purchases for capturing early adopters (e.g., users predicted to purchase a product within a week or some other time duration after being presented the campaign), or long-term views for driving product awareness (e.g., users predicted to purchase the product within a month or some other time duration after being presented the campaign).

In one or more embodiments, the audience request 120 may indicate a set of products, a goal for the campaign advertising the product, and a desired segment size (e.g., desired number of users to include in the target audience), but may not provide descriptive information for the target audience (e.g., the request to generate a target audience may amount to a request to "find an audience for the campaign" instead of "finding an audience that has this criteria"). The ML model 108 receives user purchase and advertisement history within the computer-based system 104 as inputs, and predicts user responses to an advertisement campaign over a given time horizon (e.g., will the user satisfy the goal within a week, a month, a year, etc.). After determining the probabilities of users to satisfy the objective(s) 122, the ML model 108 may select the users with the highest probabilities to satisfy the objective(s) 122.

In one or more embodiments, the computer-based system 104 may include one or more APIs associated with the one or more devices 106 that may determine and provide an expected composition of the final audience by stages of the ad funnel to which the users belong at the time (e.g., awareness of a product/brand, interest in a product/brand, evaluation of a product/brand, purchase of a product/brand, etc.). The audience request 120 may specify what proportions of users from each stage of the ad funnel should be targeted, and the proportions may be forwarded to the ML model 108, which may adjust the composition of the final audience. The resultant target audiences are returned with the updated statistics for proportions of users by each stage of the ad funnel together with more detailed insights into the targeted audience. The iterative model retraining based on advertiser feedback on the desired composition of the audience may continue until a desired target audience and goal metric is reached.

In one or more embodiments, in order to bridge rule-based targeting with model-based audiences, the ML model 108 may learn customer propensity conditioned on a targeting expression. The targeting expression may be sent with customer history as an input to the ML model 108, which may select high-propensity customers who are also likely to satisfy the targeting expression.

In one or more embodiments, the use of enhanced goal-based audiences may automatically identify relevant system users and eliminate the need for advertisers to combine multiple rule-based user groups to meet a campaign objective. For example, instead of having to combine 10-15 user groups in a campaign by targeting users who are ready to purchase a pair of headphones (e.g., user groups with users shopping for headphones, users shopping for headphone accessories, technology early-adopters etc.), the computer-based system 104 may allow advertisers simply to specify a campaign goal (e.g., to drive product purchases), and may generate an audience that includes the relevant set of users, instead of several user groups. Advertisers may trade off reach versus performance of targeting using a single goal-based audience. In addition to the campaign goal, advertisers may opt to indicate that including more users in their audience is a priority over including the highest propensity users, or vice versa.

In one or more embodiments, to configure a goal-based audience, the audience request 120 may specify a list of unique product identifiers (e.g., Unique Product Codes, Standard Identification Numbers, and the like), brands or retail categories, a campaign goal, and reach versus performance preferences. The computer-based system 104 may identify customer behaviors, including product views, purchases, search queries, and previous interactions with ads, that help to predict a user's propensity (e.g., probability or likelihood) to respond to the campaign (e.g., by performing actions that satisfy the goal, such as purchasing a product, adding a subscription, viewing or otherwise interacting with an advertisement, downloading content, and the like). The user behaviors may be combined in the ML model 108 to estimate the probability that any user will, for example, purchase one of the promoted product identifiers as a result of being shown an advertisement. Users may be included in the goal-based audience according to their estimated propensities (e.g., the most likely users to satisfy a goal may be selected, and users less likely to satisfy the goal may be excluded from the audience). The ML model's underlying goal-based audiences may be updated to reflect changing trends in consumer behavior.

In one or more embodiments, a goal-based audience may refer to an audience built using the ML model 108 and without the request to generate the audience having descriptive information for the audience. The ML model 108 may be trained to identify the users of the computer-based system 104 most likely to respond to the campaign objective(s) 122 based on a variety of data signals. The audience request 120 may specify a list of product identifiers, brands, or retail categories, and a goal that the advertisers would like to drive against their selection. For example, for a conversion goal based on driving purchases, the computer-based system 104 may use the ML model 108 to estimate the probability any user (e.g., based on their historical behavioral interaction with the system, such as purchases, page views, clicks, ad views, downloads, uploads, subscriptions, product reviews, etc.) will purchase one of the specified products, within the brand, or within the retail categories selected. The ML model 108 may use the estimates to identify users with a high-propensity to satisfy the objective(s) 122. Advertisers will be able to trade off performance against reach by changing the underlying propensity threshold used to define their audience. Performance may be defined as a more exclusive audience that has a higher sensitivity to the relevancy of users included relative to the specified marketing goal versus reach defined by the number of unique users included in the audience. Because a goal-based audience is based on a predictive model, the computer-based system 104 also may have the ability to constantly update the model in response to users' changes in behavior (e.g., whether users performed actions that satisfied the goal within a specified amount of time). For example, the probability thresholds and actions used to identify users likely to perform actions that satisfy or are likely to lead to satisfying the goal may be adjusted.

In one or more embodiments, instead of building a model from scratch for each goal-based audience, the computer-based system 104 may implement a single, larger model that simultaneously may support many goal-based audiences. The computer-based system 104 may use techniques originating from natural language processing and may build a deep neural network which may model a sequence of user interactions using the system (e.g., a web or application-based system that allows users to search for products, view product pages, purchase products, comment on products, download content, upload content, subscribe to products, brands, and/or content, and the like), representing any event with more detailed features than browse nodes (e.g., including brand and price). The ML model 108 may be trained initially on purchase data to learn about general user interests and product/brand preferences, and then refined based on advertising data to fine-tune the model to identify users most likely to respond to advertisements, and specialized for any advertising goal. In contrast to some existing models, the enhanced model regularly may be retrained (e.g., at a daily cadence) to respond to changing customer behavior.

In one or more embodiments, based on the objective 122 for the campaign, the ML model 108 of the computer-based system 104 may identify users of the computer-based system 104 who already have satisfied the objective. For example, when the objective is to drive purchases of a product, the computer-based system 104 may identify users of the system who have purchased the product advertised by the campaign, and/or who have purchased similar products (e.g., based on a mapping or other relationship between individual unique product identifiers accessible to the computer-based system 104). The users who already have performed actions that have achieved the campaign objective may be included in the target audience depending on the objective (e.g., when the objective is to cause repeat purchases), or may be excluded because those users are already interested in a product/brand. The ML model 108 may identify the actions performed by those users before they achieved the objective, such as which ads, product pages, subscriptions, etc. the user viewed, signed up for, etc. before achieving the objective 122 (e.g., before purchasing a product when the objective is to drive new purchases). The ML model 108 may determine which actions performed are more likely to have resulted in (e.g., caused) the performance of the action that satisfied the objective. For example, an action of viewing an ad for an unrelated product or campaign may be assigned a lower probability for causing performance of the action that satisfied the objective that an action of viewing an ad for the product that was purchased. The ML model 108 may identify correlations between actions taken by the users before the performance of the action that satisfied the objective, and actions that are more common and/or more directly related to the performance of the action that satisfied the objective may be identified as higher value actions.

In one or more embodiments, using the higher value actions, the ML model 108 may identify other users who have performed the higher value actions, but who have not yet performed the action that satisfied the objective. The users who have performed the higher value actions, but who have not yet performed the action that satisfied the objective may be selected for inclusion in a target audience because they may represent users who are more likely to perform the action that satisfied the objective based on their prior actions.

In one or more embodiments, the ML model 108 may evaluate the timeframes when users perform an action relative to when the users performed a prior action. For example, some users may purchase a product within a week of being presented an advertisement, while other users may take longer to purchase the product after being presented the advertisement. The objective of a campaign may specify a time duration, and the ML model 108 therefore may select users based on the timing of their actions to satisfy the time duration criteria. For example, when the time duration criteria is to drive product page views within a week of ad presentation, the ML model 108 may include users who have viewed product pages within a week of prior ad presentation, and may exclude users who failed to view product pages within a week of prior ad presentation. Even without time duration criteria, the ML model 108 may generate multiple target audiences for an objective. For example, one target audience may include users who are likely to perform an action that would satisfy an objective within a first time duration, and another target audience may include users who are likely to perform the action within a second time duration. The ML model 108 may adjust the audiences for a given campaign based on an ad funnel, such as by generating audiences targeted for increased product/brand awareness, generating target audiences for driving subscriptions, generating target audiences for driving product purchases, and the like.

In one or more embodiments, the ML model 108 may receive feedback regarding the performance of campaigns, and may adjust selection criteria for generating target audiences. For example, when the performed actions of system users used to select users for the target audience do not result in achieving the objective (e.g., the number of purchases, views, etc. are below a threshold number), the ML model 108 may lower the probability of the performed actions causing the performance of subsequent actions that satisfy the objective, and may select users for target audiences based on different actions for particular objective, product, brand, etc. The ML model 108 may remove from the audience users who do not respond to a campaign, for example.

The users 102, the computer-based system 104, and/or the user device 140 may include any suitable processor-driven device including, but not limited to, a mobile device or a non-mobile, e.g., a static, device. For example, the users 102, the computer-based system 104, and/or the user device 140 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, or the like. It is understood that the above is an example list of devices and is not meant to be comprehensive.

Figure 2:
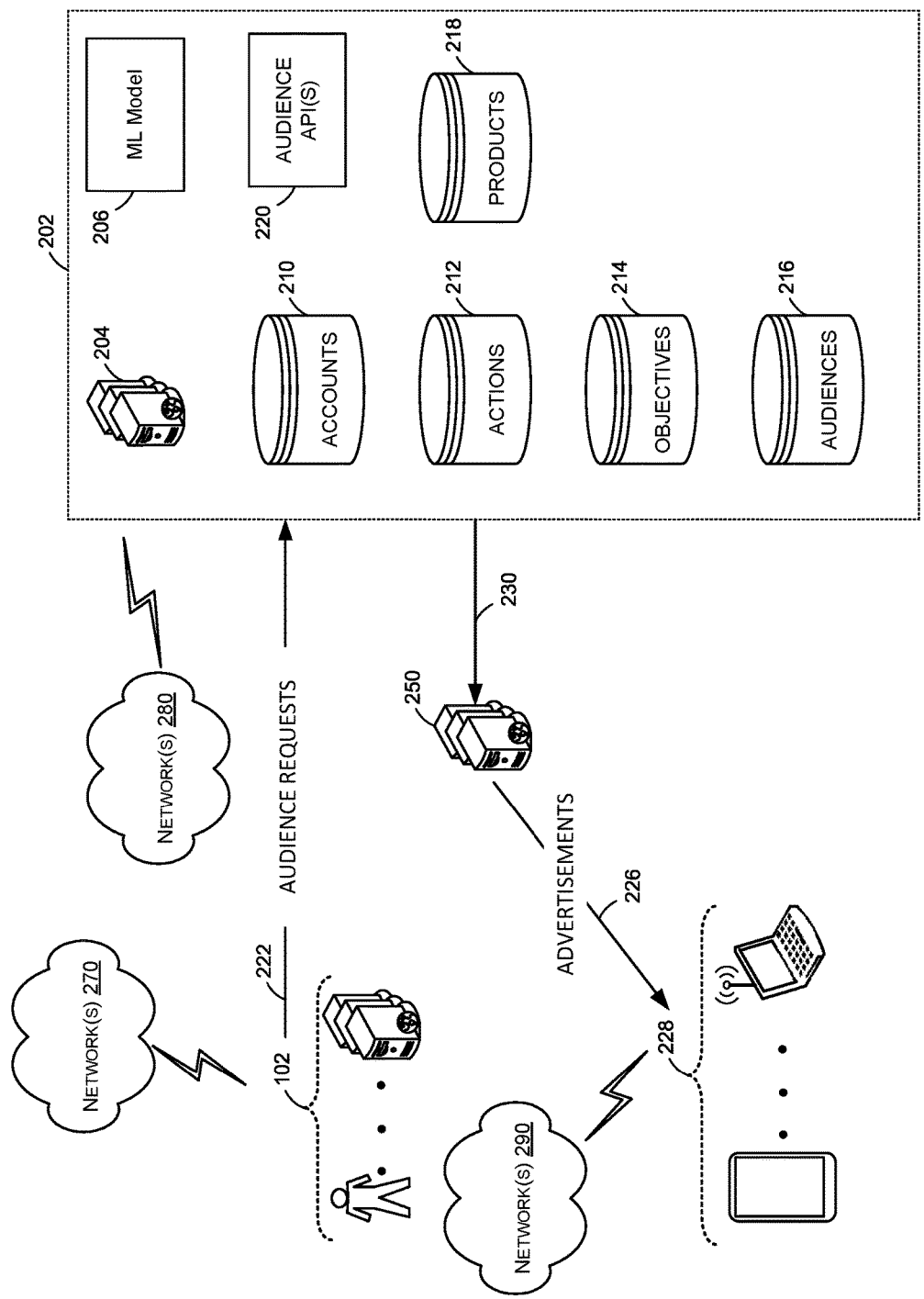
FIG. 2 illustrates an example system for goal-based audience selection, in accordance with one or more example embodiments of the present disclosure.

FIG. 2 illustrates an example system 200 for goal-based audience selection, in accordance with one or more example embodiments of the present disclosure.

Referring to FIG. 2, the users 102 of FIG. 1 may communicate with a computer-based system 202 (e.g., similar to the computer-based system 104 of FIG. 1), which may include one or more devices 204 (e.g., similar to the one or more devices 106 of FIG. 1), a ML model 206 (e.g., similar to the ML model 108 of FIG. 1), account data storage 210 (e.g., storing user account data), action data storage 212 (e.g., storing actions taken by user accounts, such as purchase data, subscription data, product page views, advertisement interactions, and other user actions as described herein), objectives data storage 214 (e.g., storing advertisement campaign objectives), audiences data storage 216 (e.g., storing target audience data for audiences generated for advertisement campaigns), products data storage 218 (e.g., storing product identifiers and mappings between similar products, information about product sellers/brands, and the like). The computer-based system 202 may include audience APIs 220 that may determine and provide to the ML model 206 an expected composition of an audience by stages of the ad funnel to which users belong at the time (e.g., awareness of a product/brand, interest in a product/brand, evaluation of a product/brand, purchase of a product/brand, etc.).

Still referring to FIG. 2, the computer-based system 202 (e.g., the one or more devices 204) may receive audience requests 222 from the users 102 to generate a target audience for an advertisement campaign. The audience requests 222 may include objectives (e.g., goals) for the advertisement campaign, and the ML model 206 may identify users for the computer-based system 202 to generate one or more target audiences based on the objectives without the audience requests 222 specifying which users to include in the target audiences. When the computer-based system 202 has generated a goal-based target audience for an advertisement campaign, the computer-based system 202 may facilitate the presentation of advertisements 226 to user devices 228 (e.g., similar to the user device 140 of FIG. 1) corresponding to the users of the target audience. For example, the computer-based system 202 may send an indication of the target audience 230 to an advertisement server 250 or other party (not shown) so that the party that serves the advertisements may serve the advertisements 226 to the user devices 228 for presentation.

In one or more embodiments, the computer-based system 202 may be associated with an online purchasing system with which users (e.g., the user devices 228) may view products and product pages, add products to a shopping cart, purchase products, subscribe to products and content, download and upload content, sell products, review products, and the like. In this manner, the computer-based system 202 may have access to user actions such as product page views, purchases, subscriptions, and the like.

In one or more embodiments, the objectives of an advertisement campaign (e.g., as specified by the audience requests 222 may include user interactions with products, including, but not limited to, general purchases, ad-attributed purchases or views of the product, brand awareness, and the like. The objectives may be combined with time effects for fine-tuned targeting, such as short-term purchases for capturing early adopters (e.g., users predicted to purchase a product within a week or some other time duration after being presented the campaign), or long-term views for driving product awareness (e.g., users predicted to purchase the product within a month or some other time duration after being presented the campaign).

In one or more embodiments, the audience requests 222 may indicate a set of products (e.g., which may be identified by the computer-based system 202 based on the products data storage 218), a goal/objective for the campaign advertising the product, and a desired segment size (e.g., desired number of users to include in the target audience), but may not provide descriptive information for the target audience (e.g., the request to generate a target audience may amount to a request to "find an audience for the campaign" instead of "finding an audience that has this criteria"). The computer-based system 202 may receive user purchase and advertisement history (e.g., based on the accounts data storage 210 and the actions data storage 212) within the computer-based system 202 as inputs, and may predict user responses to an advertisement campaign over a given time horizon (e.g., will the user satisfy the goal within a week, a month, a year, etc.). After determining the probabilities of users to satisfy the objective(s), the computer-based system 202 may select the users with the highest probabilities to satisfy the objective(s) for the target audience 230.

In one or more embodiments, the computer-based system 202 may include the one or more audience APIs 220 that may determine and provide an expected composition of the final audience by stages of the ad funnel to which the users belong at the time (e.g., awareness of a product/brand, interest in a product/brand, evaluation of a product/brand, purchase of a product/brand, etc.). The audience requests 222 may specify what proportions of users from each stage of the ad funnel should be targeted, and the proportions may be forwarded to the ML model 206, which may adjust the composition of the final audience. The resultant target audiences 230 are returned with the updated statistics for proportions of users by each stage of the ad funnel together with more detailed insights into the targeted audience 230. The iterative model retraining based on advertiser feedback on the desired composition of the audience may continue until a desired target audience and goal metric is reached.

In one or more embodiments, in order to bridge rule-based targeting with model-based audiences, the ML model 206 may learn customer propensity conditioned on a targeting expression. The targeting expression may be sent with customer history (e.g., the actions data storage 212) as an input to the ML model 206, which may identify criteria with which the computer-based system 202 may select high-propensity customers who are also likely to satisfy the targeting expression for the target audience 230.

In one or more embodiments, to configure a goal-based audience, the audience requests 222 may specify a list of unique product identifiers (e.g., Unique Product Codes, Standard Identification Numbers, and the like), brands or retail categories, a campaign goal, and reach versus performance preferences. The computer-based system 202 may, using the accounts data storage 210 and the actions data storage 212, identify customer behaviors, including product views, purchases, search queries, and previous interactions with ads, that help to predict a user's propensity (e.g., probability or likelihood) to respond to the campaign (e.g., by performing actions that satisfy the goal, such as purchasing a product, adding a subscription, viewing or otherwise interacting with an advertisement, downloading content, and the like). The user behaviors may be combined in the ML model 206 to estimate the probability that any user will, for example, purchase one of the promoted product identifiers as a result of being shown an advertisement. Users may be included in the goal-based audience 230 according to their estimated propensities (e.g., the most likely users to satisfy a goal may be selected, and users less likely to satisfy the goal may be excluded from the audience). The ML model's underlying goal-based audiences may be updated to reflect changing trends in consumer behavior.

In one or more embodiments, a goal-based audience may refer to an audience built using the ML model 206 and without the request to generate the audience having descriptive information for the audience. The ML model 206 may be trained to identify the users of the computer-based system 202 most likely to respond to the campaign objective(s) based on a variety of data signals. The audience requests 222 may specify a list of product identifiers, brands, or retail categories, and a goal that the advertisers would like to drive against their selection. For example, for a conversion goal based on driving purchases, the computer-based system 202 may use the ML model 206 to estimate the probability any user (e.g., based on their historical behavioral interaction with the system, such as purchases, page views, clicks, ad views, downloads, uploads, subscriptions, product reviews, etc.) will purchase one of the specified products, within the brand, or within the retail categories selected. The ML model 206 may use the estimates to identify users with a high-propensity to satisfy the objective(s). Because a goal-based audience is based on a predictive model, the computer-based system 202 also may have the ability to constantly update the ML model 206 in response to users' changes in behavior (e.g., whether users performed actions that satisfied the goal within a specified amount of time). For example, the probability thresholds and actions used to identify users likely to perform actions that satisfy or are likely to lead to satisfying the goal may be adjusted.

In one or more embodiments, instead of building a model from scratch for each goal-based audience, the computer-based system 202 may implement the ML model 206 as a single, larger model that simultaneously may support many goal-based audiences. The computer-based system 202 may use techniques originating from natural language processing and may build a deep neural network which may model a sequence of user interactions using the computer-based system 202 (e.g., a web or application-based system that allows users to search for products, view product pages, purchase products, comment on products, download content, upload content, subscribe to products, brands, and/or content, and the like), representing any event with more detailed features than browse nodes (e.g., including brand and price). The ML model 206 may be trained initially on purchase data to learn about general user interests and product/brand preferences, and then refined based on advertising data to fine-tune the model to identify users most likely to respond to advertisements, and specialized for any advertising goal. In contrast to some existing models, the enhanced model regularly may be retrained (e.g., at a daily cadence) to respond to changing customer behavior.

In one or more embodiments, based on the objective(s) for a campaign (e.g., as specified in the audience requests 222), the computer-based system 202 may identify users of the computer-based system 202 who already have satisfied the objective. For example, when the objective is to drive purchases of a product, the computer-based system 202 may identify users of the system who have purchased the product advertised by the campaign, and/or who have purchased similar products (e.g., based on a mapping or other relationship between individual unique product identifiers accessible to the computer-based system 202). The users who already have performed actions that have achieved the campaign objective may be included in the target audience depending on the objective (e.g., when the objective is to cause repeat purchases), or may be excluded because those users are already interested in a product/brand. The ML model 206 may identify the actions performed by those users before they achieved the objective, such as which ads, product pages, subscriptions, etc. the user viewed, signed up for, etc. before achieving the objective (e.g., before purchasing a product when the objective is to drive new purchases). The ML model 206 may determine which actions performed are more likely to have resulted in (e.g., caused) the performance of the action that satisfied the objective. For example, an action of viewing an ad for an unrelated product or campaign may be assigned a lower probability for causing performance of the action that satisfied the objective that an action of viewing an ad for the product that was purchased. The ML model 206 may identify correlations between actions taken by the users before the performance of the action that satisfied the objective, and actions that are more common and/or more directly related to the performance of the action that satisfied the objective may be identified as higher value actions.

In one or more embodiments, using the higher value actions, the computer-based system 202 may identify other users who have performed the higher value actions, but who have not yet performed the action that satisfied the objective. The users who have performed the higher value actions, but who have not yet performed the action that satisfied the objective may be selected for inclusion in a target audience because they may represent users who are more likely to perform the action that satisfied the objective based on their prior actions.

In one or more embodiments, the ML model 206 may evaluate the timeframes when users perform an action relative to when the users performed a prior action. For example, some users may purchase a product within a week of being presented an advertisement, while other users may take longer to purchase the product after being presented the advertisement. The objective of a campaign may specify a time duration, and the computer-based system 202 therefore may select users based on the timing of their actions to satisfy the time duration criteria. For example, when the time duration criteria is to drive product page views within a week of ad presentation, the computer-based system 202 may include users who have viewed product pages within a week of prior ad presentation, and may exclude users who failed to view product pages within a week of prior ad presentation. Even without time duration criteria, the computer-based system 202 may generate multiple target audiences for an objective. For example, one target audience may include users who are likely to perform an action that would satisfy an objective within a first time duration, and another target audience may include users who are likely to perform the action within a second time duration. The ML model 206 may adjust the audiences for a given campaign based on an ad funnel, such as by generating audiences targeted for increased product/brand awareness, generating target audiences for driving subscriptions, generating target audiences for driving product purchases, and the like.

In one or more embodiments, the ML model 206 may receive feedback regarding the performance of campaigns, and may adjust selection criteria for generating target audiences. For example, when the performed actions of system users used to select users for the target audience do not result in achieving the objective (e.g., the number of purchases, views, etc. are below a threshold number), the ML model 206 may lower the probability of the performed actions causing the performance of subsequent actions that satisfy the objective, and may select users for target audiences based on different actions for particular objective, product, brand, etc. The computer-based system 202 may remove from the audience users who do not respond to a campaign, for example.

The one or more users 102 may be configured to communicate via a communications network 270, the computer-based system 202 may be configured to communicate via a communications network 280, and the user devices 228 may be configured to communicate via a communications network 290, wirelessly or wired (e.g., the same or different wireless communications networks). The communications network 270, the communications network 280, and the communications network 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270, the communications network 280, and the communications network 290 may have any suitable communication range associated therewith and may include, for example, global networks (e.g., the Internet), metropolitan area networks (MANs), wide area networks (WANs), local area networks (LANs), or personal area networks (PANs). In addition, communications network 270, the communications network 280, and the communications network 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
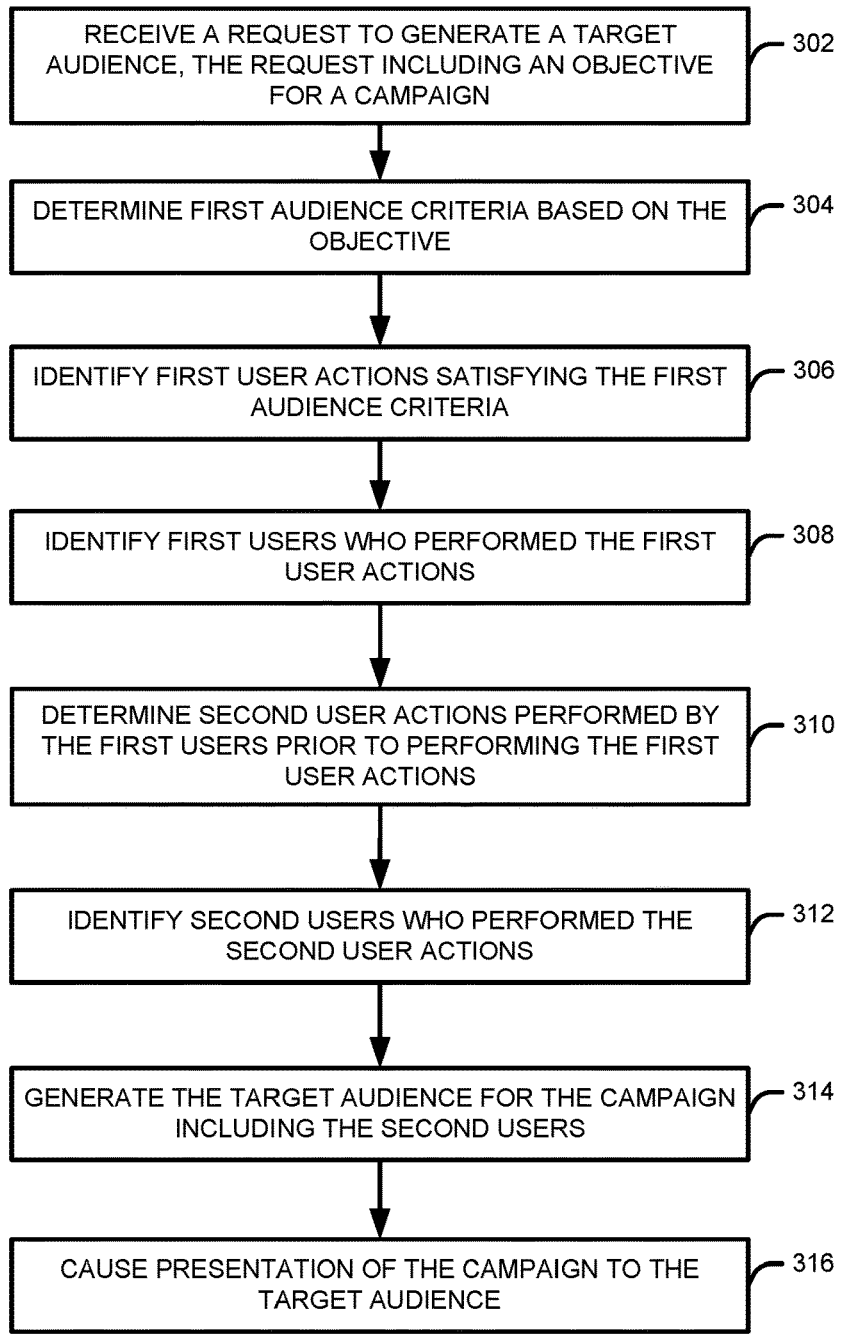
FIG. 3 illustrates a flow diagram for a process for goal-based audience selection, in accordance with one or more example embodiments of the present disclosure.

FIG. 3 illustrates a flow diagram for a process 300 for goal-based audience selection, in accordance with one or more example embodiments of the present disclosure.

At block 302, a system (or device, e.g., the computer-based system 104 of FIG. 1, the computer-based system 202 of FIG. 2) may receive a request (e.g., the audience request 120 of FIG. 1, the audience requests 222 of FIG. 2) to generate a target audience for an advertisement campaign, and the request may include a goal/objective for an advertisement campaign. In goal-based advertising, the request may not provide any information about the target audience. In this manner, goal-based advertising may be distinguished from descriptive advertising in which the advertiser (or another party) provides descriptive information for a target audience, such as demographics, product purchases, page views, advertisement views, computer system interactions, user subscriptions, and the like. When the advertiser provides descriptive information for a target audience, a system with access to user information may determine whether any users satisfy the descriptive information (e.g., share the demographic information, have purchased a particular product, have performed a computer-based action, have a subscription, and the like). The absence of descriptive information provided for a requested target audience is a feature of goal-based advertising, as advertisers often may not know who the target audience should be and what characteristics the target audience should have in order to achieve one or more goals, such as product purchases, product/page views, advertisement views/interactions, sign-ups, downloads, increasing brand awareness, and the like.

At block 304, the system (e.g., using the ML model 108 of FIG. 1 or the ML model 206 of FIG. 2) may determine first audience criteria based on the objective. For example, when the objective includes increasing product awareness among users of the system, the first audience criteria may include product page views or other interactions with product information provided by the system that would make users of the system aware of a product (e.g., a product specified by the audience request). When the objective is to increase product purchases, the system may identify users of the system who have purchased the product advertised by the campaign, and/or who have purchased similar products (e.g., based on a mapping or other relationship between individual unique product identifiers accessible to the system).

At block 306, the system (e.g., using the ML model 108 of FIG. 1 or the ML model 206 of FIG. 2) may identify first user actions satisfying the first audience criteria. When the first audience criteria is page views, then the first user actions may include product page views (e.g., using a web-based application, mobile application, or the like). When the first audience criteria is product purchases, the first user actions may include purchases of a product or brand identified by the request of block 302, purchases of similar products by the same brand or another seller (e.g., based on product mappings using the products data storage 218 of FIG. 2), or other purchase data.

At block 308, the system (e.g., using the ML model 108 of FIG. 1 or the ML model 206 of FIG. 2) may identify first users who performed the first user actions. Using the actions data storage 212 of FIG. 2, for example, the system may determine which users have performed the first user actions (and within a particular timeframe). The first users who performed the first user actions may be included in a target audience depending on the objective (e.g., repeat customers), or may be excluded from the target audience because they already have achieved the objective. Either way, other actions of the first users who performed the first user actions may be analyzed to identify relevant actions that may have led (e.g., caused) to the first users having performed the first user actions.

At block 310, the system (e.g., using the ML model 108 of FIG. 1 or the ML model 206 of FIG. 2) may determine additional user actions (e.g., second user actions, third user actions, etc.) performed by the first users prior to the first users' performance of the first actions (e.g., what actions did the first users perform prior to the first user actions that may have led to the first users performance of the first user actions?). In this manner, the system may distinguish between high-value and low-value actions, and may identify users to include in a target audience based on whether the user have performed or are likely to perform any of the additional actions of the first users. For example, when the percentage of the first users who placed products into a virtual shopping cart prior to purchasing the products (e.g., performing the first user actions) is higher than the percentage of the first users who viewed product pages of the same products prior to performing the first user actions, the system may determine that the acts of placing products into a virtual shopping cart or having a subscription have a stronger likelihood of leading to a product purchase than does viewing a product page for the same product. The system may assign probabilities that the second user actions caused the first user actions, and when the probability of an action exceeds a probability threshold, the system may select a user action as likely to cause another user action (e.g., the first user actions). The second user actions may be used to identify second users who have not yet performed the first user actions, but may be likely to perform the first user actions at some time given that the second users have performed the second actions.

At block 312, the system (e.g., using the ML model 108 of FIG. 1 or the ML model 206 of FIG. 2) may identify the second users who performed the second user actions, but may not yet have performed the first user actions. Based on the identification of the second user actions, the system may identify (e.g., using the actions data storage 212 and the accounts data storage 210 of FIG. 2) whether a user has performed the second user actions and/or the first user actions. The system may select the second users for the targeted audience. The system also may consider how likely a second user is to perform the first user actions within a time period based on their user history, and may filter the second users based on whether the second users are likely to perform the first users actions within the timeframe after being presented the campaign.

At block 314, the system (e.g., using the ML model 108 of FIG. 1 or the ML model 206 of FIG. 2) may generate the target audience by including the second users in the target audience. The first users may be included in or excluded from the target audience (e.g., depending on whether the objective allows for repeat actions of the first users). At block 316, the system may cause presentation of the campaign to the devices of the target audience (e.g., the device 140 of FIG. 1, the devices 228 of FIG. 2). For example, system may send device or account details to the requesting party for the audience, or to another party (e.g., the advertisement server 250 of FIG. 2) to facilitate serving of the campaign to the users selected for the target audience.

Figure 4:
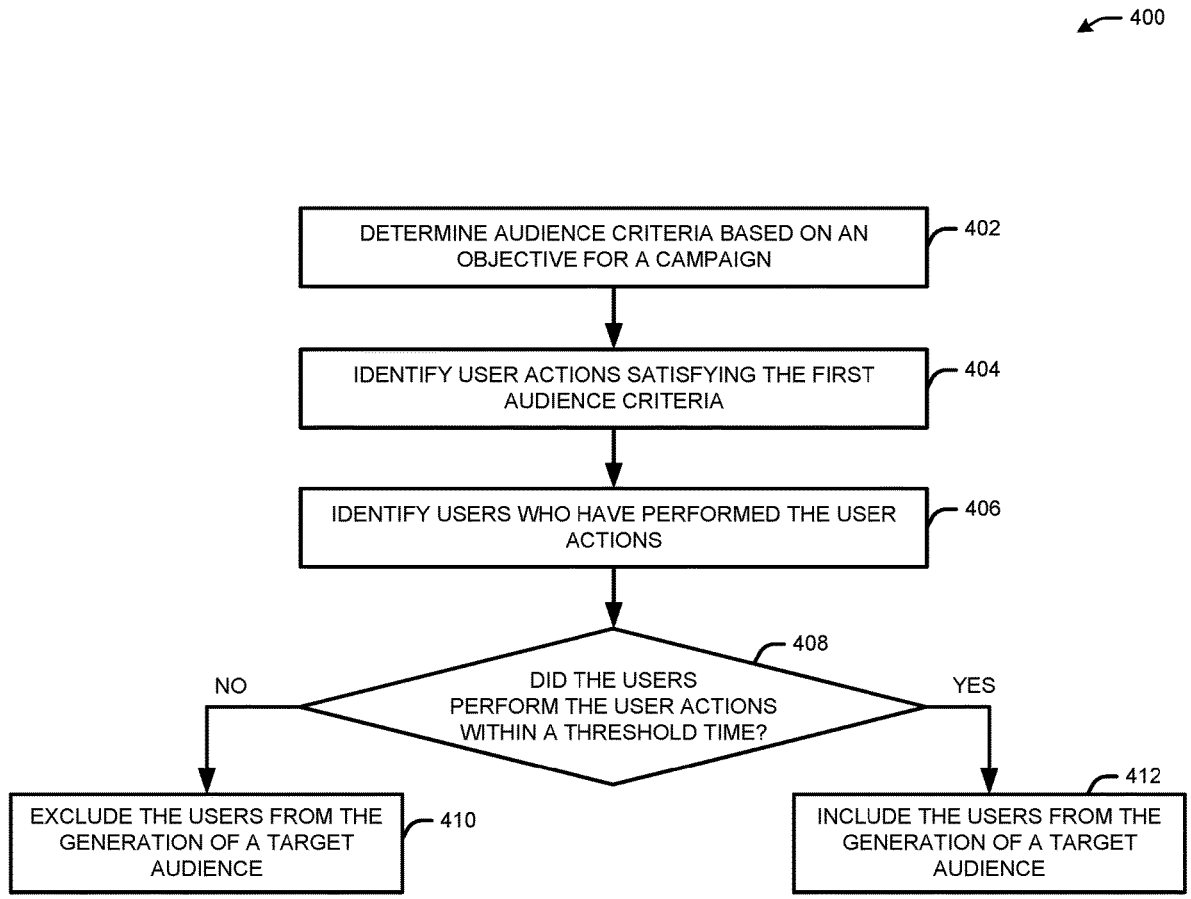
FIG. 4 illustrates a flow diagram for a process for goal-based audience selection, in accordance with one or more example embodiments of the present disclosure.

FIG. 4 illustrates a flow diagram for a process 400 for goal-based audience selection, in accordance with one or more example embodiments of the present disclosure.

At block 402, a system (or device, e.g., the computer-based system 104 of FIG. 1, the computer-based system 202 of FIG. 2) may determine audience criteria for generating a target audience for an advertisement campaign based on an objective specified for the campaign. For example, the system may receive a request (e.g., the audience request 120 of FIG. 1, the audience requests 222 of FIG. 2) to generate a target audience for an advertisement campaign, and the request may include a goal/objective for an advertisement campaign. In goal-based advertising, the request may not provide any information about the target audience. In this manner, goal-based advertising may be distinguished from descriptive advertising in which the advertiser (or another party) provides descriptive information for a target audience, such as demographics, product purchases, page views, advertisement views, computer system interactions, user subscriptions, and the like. When the advertiser provides descriptive information for a target audience, a system with access to user information may determine whether any users satisfy the descriptive information (e.g., share the demographic information, have purchased a particular product, have performed a computer-based action, have a subscription, and the like). The absence of descriptive information provided for a requested target audience is a feature of goal-based advertising, as advertisers often may not know who the target audience should be and what characteristics the target audience should have in order to achieve one or more goals, such as product purchases, product/page views, advertisement views/interactions, sign-ups, downloads, increasing brand awareness, and the like. The system (e.g., using the ML model 108 of FIG. 1 or the ML model 206 of FIG. 2) may determine first audience criteria based on the objective. For example, when the objective includes increasing product awareness among users of the system, the first audience criteria may include product page views or other interactions with product information provided by the system that would make users of the system aware of a product (e.g., a product specified by the audience request). When the objective is to increase product purchases, the system may identify users of the system who have purchased the product advertised by the campaign, and/or who have purchased similar products (e.g., based on a mapping or other relationship between individual unique product identifiers accessible to the system).

At block 404, the system (e.g., using the ML model 108 of FIG. 1 or the ML model 206 of FIG. 2) may identify user actions satisfying the first audience criteria. When the audience criteria is page views, then the first user actions may include product page views (e.g., using a web-based application, mobile application, or the like). When the audience criteria is product purchases, the user actions may include purchases of a product or brand identified by the audience request, purchases of similar products by the same brand or another seller (e.g., based on product mappings using the products data storage 218 of FIG. 2), or other purchase data.

At block 406, the system (e.g., using the ML model 108 of FIG. 1 or the ML model 206 of FIG. 2) may identify users who performed the first user actions. Using the actions data storage 212 of FIG. 2, for example, the system may determine which users have performed the first user actions (and within a particular timeframe). The users who performed the user actions may be included in a target audience depending on the objective (e.g., repeat customers), or may be excluded from the target audience because they already have achieved the objective. Either way, other actions of the users who performed the first user actions may be analyzed to identify relevant actions that may have led (e.g., caused) to the users having performed the user actions.

At block 408, the system (e.g., using the ML model 108 of FIG. 1 or the ML model 206 of FIG. 2) may determine whether the users performed the user actions within a threshold time period. In this manner, block 408 of FIG. 4 represents an additional filter to block 308 of FIG. 3 in that the system may determine whether users are likely to perform user actions satisfying the campaign objective within a timeframe (e.g., an hour, a day, a week, etc.). The objective may include a timeframe (e.g., view a product page or purchase a product within the timeframe). The system may generate multiple target audiences for an objective, such as a target audience likely to satisfy the objective within a first timeframe, a target audience likely to satisfy the objective within a second timeframe, and so on. Whether a user is likely to perform an action within a timeframe may be based on whether the user performed a user action within a threshold time (e.g., whether a user viewed a product page, purchased a product, signed up for a subscription, etc. within a threshold time after receiving/interacting with an advertisement, etc.).

When the users did not perform the user actions within the threshold time at block 408, the users may be excluded at block 410 from the generation of the target audience. For example, if the users never performed the user actions or performed the user actions after the threshold time, the system may determine that the users are not candidates for a given target audience, or that other actions of the users (e.g., for analysis of block 310 of FIG. 3) are not likely to lead to the campaign objective being satisfied. When the users did perform the user actions within the threshold time at block 408, the users may be included at block 412 in the generation of the target audience. For example, other actions of the users may be used in the analysis of block 310 of FIG. 3 to identify second users to include in the campaign because the users who performed the user actions within the threshold time are more likely to provide useful insights regarding which other actions may lead to satisfying the campaign than the actions of the users who did not perform the user actions within the threshold time at block 408.

Figure 5:
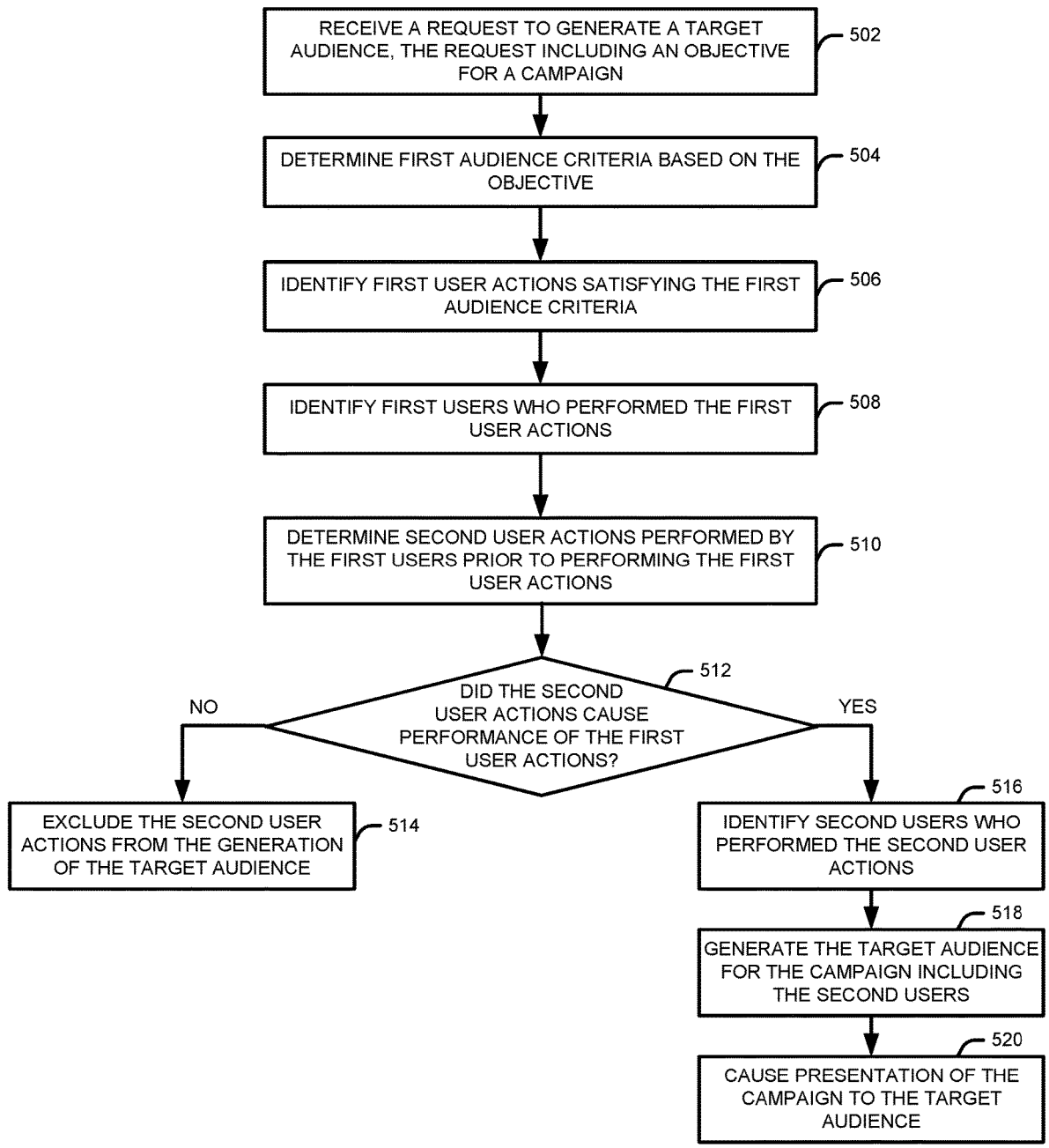
FIG. 5 illustrates a flow diagram for a process for goal-based audience selection, in accordance with one or more example embodiments of the present disclosure.

FIG. 5 illustrates a flow diagram for a process 500 for goal-based audience selection, in accordance with one or more example embodiments of the present disclosure.

At block 502, a system (or device, e.g., the computer-based system 104 of FIG. 1, the computer-based system 202 of FIG. 2) may receive a request (e.g., the audience request 120 of FIG. 1, the audience requests 222 of FIG. 2) to generate a target audience for an advertisement campaign, and the request may include a goal/objective for an advertisement campaign. In goal-based advertising, the request may not provide any information about the target audience. In this manner, goal-based advertising may be distinguished from descriptive advertising in which the advertiser (or another party) provides descriptive information for a target audience, such as demographics, product purchases, page views, advertisement views, computer system interactions, user subscriptions, and the like. When the advertiser provides descriptive information for a target audience, a system with access to user information may determine whether any users satisfy the descriptive information (e.g., share the demographic information, have purchased a particular product, have performed a computer-based action, have a subscription, and the like). The absence of descriptive information provided for a requested target audience is a feature of goal-based advertising, as advertisers often may not know who the target audience should be and what characteristics the target audience should have in order to achieve one or more goals, such as product purchases, product/page views, advertisement views/interactions, sign-ups, downloads, increasing brand awareness, and the like.

At block 504, the system (e.g., using the ML model 108 of FIG. 1 or the ML model 206 of FIG. 2) may determine first audience criteria based on the objective. For example, when the objective includes increasing product awareness among users of the system, the first audience criteria may include product page views or other interactions with product information provided by the system that would make users of the system aware of a product (e.g., a product specified by the audience request). When the objective is to increase product purchases, the system may identify users of the system who have purchased the product advertised by the campaign, and/or who have purchased similar products (e.g., based on a mapping or other relationship between individual unique product identifiers accessible to the system).

At block 506, the system (e.g., using the ML model 108 of FIG. 1 or the ML model 206 of FIG. 2) may identify first user actions satisfying the first audience criteria. When the first audience criteria is page views, then the first user actions may include product page views (e.g., using a web-based application, mobile application, or the like). When the first audience criteria is product purchases, the first user actions may include purchases of a product or brand identified by the request of block 502, purchases of similar products by the same brand or another seller (e.g., based on product mappings using the products data storage 218 of FIG. 2), or other purchase data.

At block 508, the system (e.g., using the ML model 108 of FIG. 1 or the ML model 206 of FIG. 2) may identify first users who performed the first user actions. Using the actions data storage 212 of FIG. 2, for example, the system may determine which users have performed the first user actions (and within a particular timeframe). The first users who performed the first user actions may be included in a target audience depending on the objective (e.g., repeat customers), or may be excluded from the target audience because they already have achieved the objective. Either way, other actions of the first users who performed the first user actions may be analyzed to identify relevant actions that may have led (e.g., caused) to the first users having performed the first user actions.

At block 510, the system (e.g., using the ML model 108 of FIG. 1 or the ML model 206 of FIG. 2) may determine additional user actions (e.g., second user actions, third user actions, etc.) performed by the first users prior to the first users' performance of the first actions (e.g., what actions did the first users perform prior to the first user actions that may have led to the first users performance of the first user actions?). In this manner, when additional actions of the first users are identified as high-value actions that indicate a likelihood of satisfying the campaign objective, the system may identify other users who have performed or are likely to perform any of the additional user actions.

At block 512, the system (e.g., using the ML model 108 of FIG. 1 or the ML model 206 of FIG. 2) may determine whether the second user actions cause performance of the first user actions. In this manner, the system may distinguish between high-value and low-value actions. For example, when the percentage of the first users who signed up for a subscription (e.g., performing the first user actions) is higher than the percentage of the first users who viewed a product page prior to performing the first user actions, the system may determine that the act of purchasing a subscription has a stronger likelihood of leading to a product purchase than does viewing a product page. The system may assign probabilities that the second user actions caused the first user actions, and when the probability of an action exceeds a probability threshold, the system may select a user action as likely to cause another user action (e.g., the first user actions). The second user actions may be used to identify second users who have not yet performed the first user actions, but may be likely to perform the first user actions at some time given that the second users have performed the second actions. When the probability that the second user actions caused performance of the first user actions exceeds a threshold probability, the system may determine that the second user actions caused performance of the first user actions (and vice versa for when the probability is below a probability threshold).

When the system determines that the second user actions did not cause performance of the first user actions at block 512, the system at block 514 may exclude the second user actions from the generation of the target audience (e.g., may not use the second user actions to identify the second users at block 312 of FIG. 3). When the system determines that the second user actions did cause performance of the first user actions at block 512, the system at block 516 may use the second user actions to identify second users.

For example, at block 516, the system (e.g., using the ML model 108 of FIG. 1 or the ML model 206 of FIG. 2) may identify the second users who performed the second user actions, but may not yet have performed the first user actions. Based on the identification of the second user actions, the system may identify (e.g., using the actions data storage 212 and the accounts data storage 210 of FIG. 2) whether a user has performed the second user actions and/or the first user actions. The system may select the second users for the targeted audience. The system also may consider how likely a second user is to perform the first user actions within a time period based on their user history, and may filter the second users based on whether the second users are likely to perform the first users actions within the timeframe after being presented the campaign.

At block 518, the system (e.g., using the ML model 108 of FIG. 1 or the ML model 206 of FIG. 2) may generate the target audience by including the second users in the target audience. The first users may be included in or excluded from the target audience (e.g., depending on whether the objective allows for repeat actions of the first users). At block 520, the system may cause presentation of the campaign to the devices of the target audience (e.g., the device 140 of FIG. 1, the devices 228 of FIG. 2). For example, system may send device or account details to the requesting party for the audience, or to another party (e.g., the advertisement server 250 of FIG. 2) to facilitate serving of the campaign to the users selected for the target audience.

These examples are not meant to be limiting.

Figure 6:
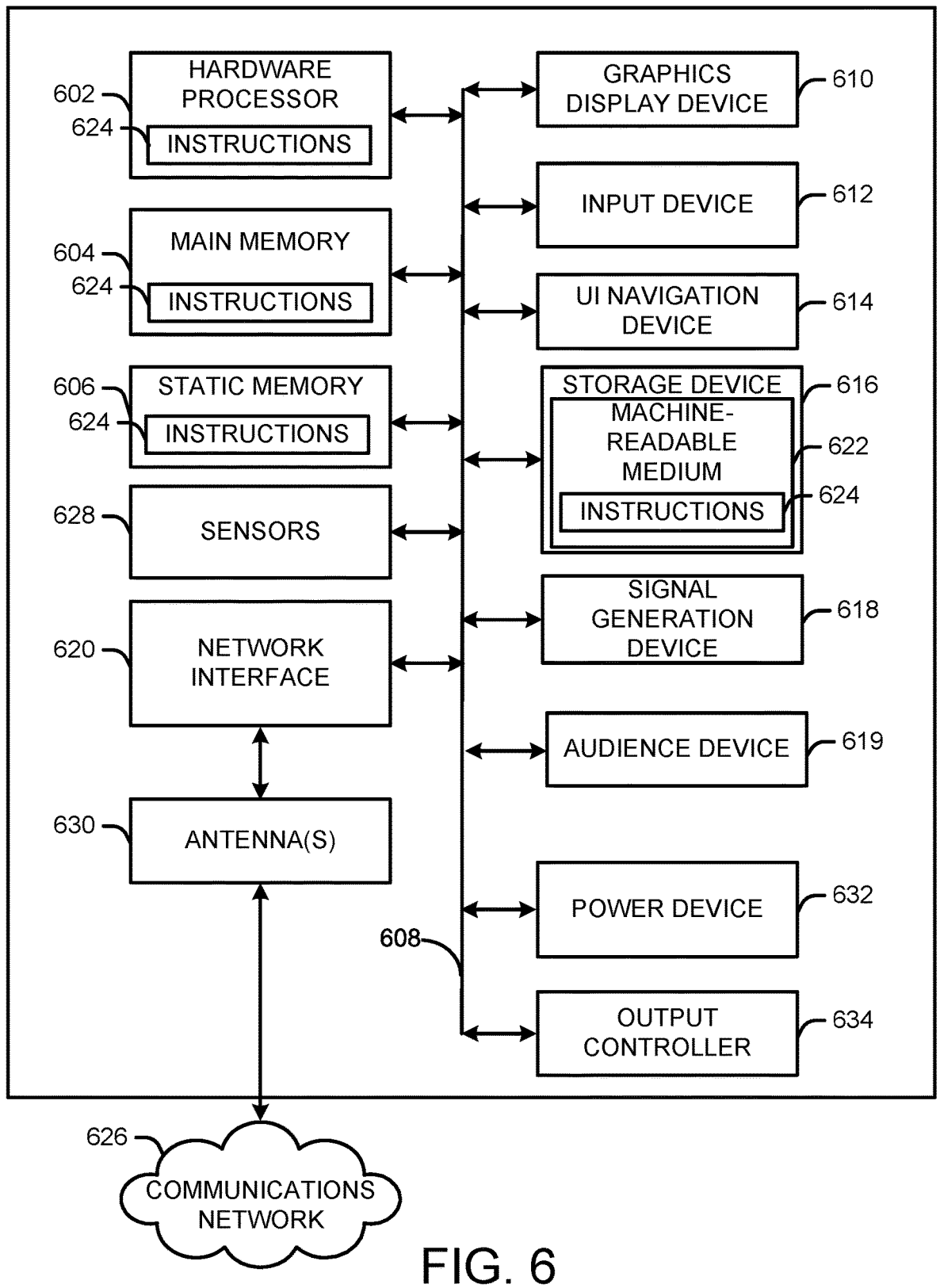
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 or system (e.g., the users 102 of FIG. 1 and FIG. 2, the computer-based system 104 of FIG. 1, the one or more devices 106 of FIG. 1, the device 140 of FIG. 1, the computer-based system 202 of FIG. 2, the one or more devices 204 of FIG. 2, the devices 228 of FIG. 2, the advertisement server 250 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, an audience device 619 (e.g., one or more modules capable of performing the process 300 of FIG. 3, the process 400 of FIG. 4, and/or the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions (e.g., software) embodying or utilized by any one or more of the techniques or functions described herein. The instructions may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for generating an audience to which to present an advertisement campaign based on an objective of the advertisement campaign, the method comprising:
    receiving, by a device, a request to generate a target audience for an advertisement campaign, wherein the request comprises an objective associated with presentation of the advertisement campaign, and wherein the target audience and audience criteria defining the target audience are absent from the request;
    generating, by the device, using a machine learning model configured to generate, responsive to the request from which the target audience and the audience criteria defining the target audience are absent, based on the machine learning model being trained with user preference data to model a sequence of user actions of a system, predictions of which of the user actions are most likely to result in satisfaction of the objective;
    identifying, by the device, using the machine learning model, first user actions of a system predicted by the machine learning model to result in satisfaction of the objective;
    identifying, by the device, using the machine learning model, first users of the system who performed the first user actions;
    determining, by the device, using the machine learning model, second user actions performed by the first users prior to performing the first user actions, the second user actions having probabilities exceeding a threshold indicating a likelihood that the second user actions will result in subsequent performance of the first user actions;
    determining, by the device, using the machine learning model, third user actions performed by the first users prior to performing the first user actions, the third user actions having probabilities below the threshold;
    identifying, by the device, using the machine learning model, based on the second user actions having probabilities exceeding the threshold, second users of the system who performed the second user actions and failed to perform the first user actions;
    generating, by the device, as an output of the machine learning model, the target audience to which to present the advertisement campaign, the target audience comprising the second users and excluding the first users;
    causing presentation, by the device, of the advertisement campaign to the target audience;
    receiving, by the device, in response to the presentation of the advertisement campaign to the target audience, data indicative of a performance of the advertisement campaign, wherein data indicative of a performance of the advertisement campaign comprises an action of viewing at least one advertisement of the advertising campaign; and
    updating, by the device, the machine learning model based on the action viewing the advertisement campaign, the data indicative of the performance of the advertisement campaign, the predictions of first user actions that are most likely to result in satisfaction of the objective.

2. The method of claim 1, wherein:
    the objective is to increase purchases of a product advertised by the advertisement campaign,
    identifying the first users of the system comprises determining that the first users have purchased the product using the system,
    determining the second user actions comprises determining that the first users viewed a product page describing the product prior to purchasing the product, and
    identifying the second users of the system who performed the second user actions and failed to perform the first user actions comprises determining that the second users have viewed the product page and have failed to purchase the product.

3. The method of claim 1, further comprising:
    identifying third users of the system who performed the first user actions;
    determining that a first subset of the third users performed the first user actions within a threshold amount of time; and
    determining that a second subset of the third users failed to perform the first user actions within the threshold amount of time,
    wherein the first users of the system comprise the first subset of the third users and exclude the second subset of the third users.

4. The method of claim 1, further comprising:
    determining third user actions performed by the first users prior to performing the first user actions;

determining a first probability that performance of the second user actions caused performance of the first user actions;
determining a second probability that performance of the third user actions caused performance of the first user actions;
determining that the first probability is greater than the second probability; and
determining that the second users are to be included in the target audience based on the first probability being greater than the second probability.

5. A method for generating an audience to which to present an advertisement campaign based on an objective of the advertisement campaign, the method comprising:
receiving, by a device, a request to generate an audience for an advertisement campaign, wherein the request comprises an objective associated with presentation of the advertisement campaign, and wherein the audience and audience criteria defining the audience are absent from the request;
generating, by the device, using a machine learning model configured to generate, responsive to the request from which the audience and the audience criteria defining the audience are absent, based on the machine learning model being trained to model a sequence of user actions of a system, predictions of first user actions that are most likely to result in satisfaction of the objective;
identifying, by the device, using the machine learning model, first users of the system who performed the first user actions using the system;
determining, by the device, using the machine learning model, second user actions performed by the first users prior to performing the first user actions, the second user actions having probabilities exceeding a threshold indicating a likelihood that the second user actions will result in subsequent performance of the first user actions;
identifying, by the device, using the machine learning model, based on the second user actions having probabilities exceeding the threshold, second users of the system who performed the second user actions;
generating, by the device, as an output of the machine learning model, a target audience to which to present the advertisement campaign, the target audience comprising the second users;
causing presentation, by the device, of the advertisement campaign to the target audience;
receiving, by the device, in response to the presentation of the advertisement campaign to the target audience, data indicative of a performance of the advertisement campaign, wherein data indicative of a performance of the advertisement campaign comprises an action of viewing at least one advertisement of the advertising campaign; and
updating, by the device, the machine learning model based on the action of viewing the advertisement campaign, the data indicative of the performance of the advertisement campaign, the predictions of first user actions that are most likely to result in satisfaction of the objective.

6. The method of claim 5, wherein the audience criteria defining the target audience comprise demographic data.

7. The method of claim 5, further comprising:
determining, based on the objective, third user actions different than the first user actions and the second user actions;
identifying third users of the system who performed the third user actions using the system;
determining fourth user actions performed by the third users prior to performing the third user actions;
identifying fourth users of the system who performed the fourth user actions and failed to perform the third user actions;
generating a second target audience to which to present the advertisement campaign, the second target audience comprising the fourth users; and
causing presentation of the advertisement campaign to the second target audience.

8. The method of claim 5, wherein identifying the first users comprises determining that the first users performed the first user actions within a first amount of time, the method further comprising:
identifying third users of the system who performed the first user actions within a second amount of time using the system, the first amount of time different than the second amount of time;
determining third user actions performed by the third users prior to performing the first user actions;
identifying fourth users of the system who performed the third user actions and failed to perform the first user actions;
generating a second target audience to which to present the advertisement campaign, the second target audience comprising the fourth users; and
causing presentation of the advertisement campaign to the second target audience.

9. The method of claim 5, wherein:
the objective is to increase purchases of a product advertised by the advertisement campaign,
identifying the first users of the system who have performed the first user actions comprises determining that the first users have purchased the product using the system, determining the second user actions comprises determining that the first users viewed a product page describing the product prior to purchasing the product, and
identifying the second users of the system who performed the second user actions and failed to perform the first user actions comprises determining that the second users have viewed the product page and have failed to purchase the product.

10. The method of claim 5, further comprising:
identifying third users of the system who performed the first user actions;
determining that a first subset of the third users performed the first user actions within a threshold amount of time; and
determining that a second subset of the third users failed to perform the first user actions within the threshold amount of time,
wherein the first users of the system comprise the first subset of the third users and exclude the second subset of the third users.

11. The method of claim 5, further comprising:
determining third user actions performed by the first users prior to performing the first user actions;
determining a first probability that performance of the second user actions caused performance of the first user actions;
determining a second probability that performance of the third user actions caused performance of the first user actions;

determining that the first probability is greater than the second probability; and determining that the second users are to be included in the target audience based on the first probability being greater than the second probability.

12. The method of claim 5, wherein the advertisement campaign is associated with a first product, the method further comprising:

identifying a unique identifier of the product;

identifying a brand associated with the product; and determining a second product associated with the brand, wherein determining the first user actions is based on the second product.

13. The method of claim 5, further comprising:

identifying third users of the second users, wherein the third users performed the first user actions using the system;

generating a second target audience to which to present the advertisement campaign, the second target audience excluding the third users; and causing presentation of the advertisement campaign to the second target audience.

14. The method of claim 5, further comprising:

identifying third users of the second users, wherein the third users failed to perform third user actions using the system after the presentation of the advertisement campaign to the target audience;

generating a second target audience to which to present the advertisement campaign, the second target audience excluding the third users; and causing presentation of the advertisement campaign to the second target audience.

15. The method of claim 5, further comprising:

determining third user actions based on the objective; and determining fourth user actions performed by the first users prior to performing the first user actions, wherein identifying the first users is based on the first users having performed the third user actions using the system, and wherein identifying the second users is based on the second users having failed to perform the fourth user actions.

16. The method of claim 5, further comprising:

receiving, from an application programming interface (API), an indication of third users associated with at least one of a product awareness, a brand awareness, or a product purchase, wherein identifying the second users is based on the indication of the third users, wherein a number of the second users is different than a number of the third users.

17. A system for generating an audience to which to present an advertisement campaign based on an objective of the advertisement campaign, the system comprising memory coupled to at least one processor, the at least one processor configured to:

receive a request to generate an audience for an advertisement campaign, wherein the request comprises an objective associated with presentation of the advertisement campaign, and wherein the audience and audience criteria defining the audience are absent from the request;

generating, using a machine learning model, responsive to the request from which the audience and the audience criteria defining the audience are absent, based on the machine learning model being trained to model a sequence of user actions of a system, predictions of first user actions that are most likely to result in satisfaction of the objective;

identify, using the machine learning model, first users of the system who performed the first user actions using the system;

determine, using the machine learning model, second user actions performed by the first users prior to performing the first user actions, the second user actions having probabilities exceeding a threshold indicating a likelihood that the second user actions will result in subsequent performance of the first user actions;

identify, using the machine learning model, based on the second user actions having probabilities exceeding the threshold, second users of the system who performed the second user actions;

generate, as an output of the machine learning model, a target audience to which to present the advertisement campaign, the target audience comprising the second users;

cause presentation of the advertisement campaign to the target audience;

receive, in response to the presentation of the advertisement campaign to the target audience, data indicative of a performance of the advertisement campaign, wherein data indicative of a performance of the advertisement campaign comprises an action of viewing at least one advertisement of the advertising campaign; and update the machine learning model based on the action of viewing the advertisement campaign, the data indicative of the performance of the advertisement campaign, the predictions of first user actions that are most likely to result in satisfaction of the objective.

18. The system of claim 17, wherein criteria defining the target audience is absent from the request.

19. The system of claim 17, wherein the at least one processor is further configured to:

determine, based on the objective, third user actions different than the first user actions and the second user actions;

identify third users of the system who performed the third user actions using the system;

determine fourth user actions performed by the third users prior to performing the third user actions;

identify fourth users of the system who performed the fourth user actions and failed to perform the third user actions;

generate a second target audience to which to present the advertisement campaign, the second target audience comprising the fourth users; and cause presentation, by the at least one processor, of the advertisement campaign to the second target audience.

20. The system of claim 17, wherein to identify the first users comprises to determine that the first users performed the first user actions within a first amount of time, wherein the at least one processor is further configured to:

identify third users of the system who performed the first user actions within a second amount of time using the system, the first amount of time different than the second amount of time;

determine third user actions performed by the third users prior to performing the first user actions;

identify fourth users of the system who performed the third user actions and failed to perform the first user actions;

generate a second target audience to which to present the advertisement campaign, the second target audience comprising the fourth users; and cause presentation, by the at least one processor, of the advertisement campaign to the second target audience.

* * * * *